UNITED STATES PATENT OFFICE.

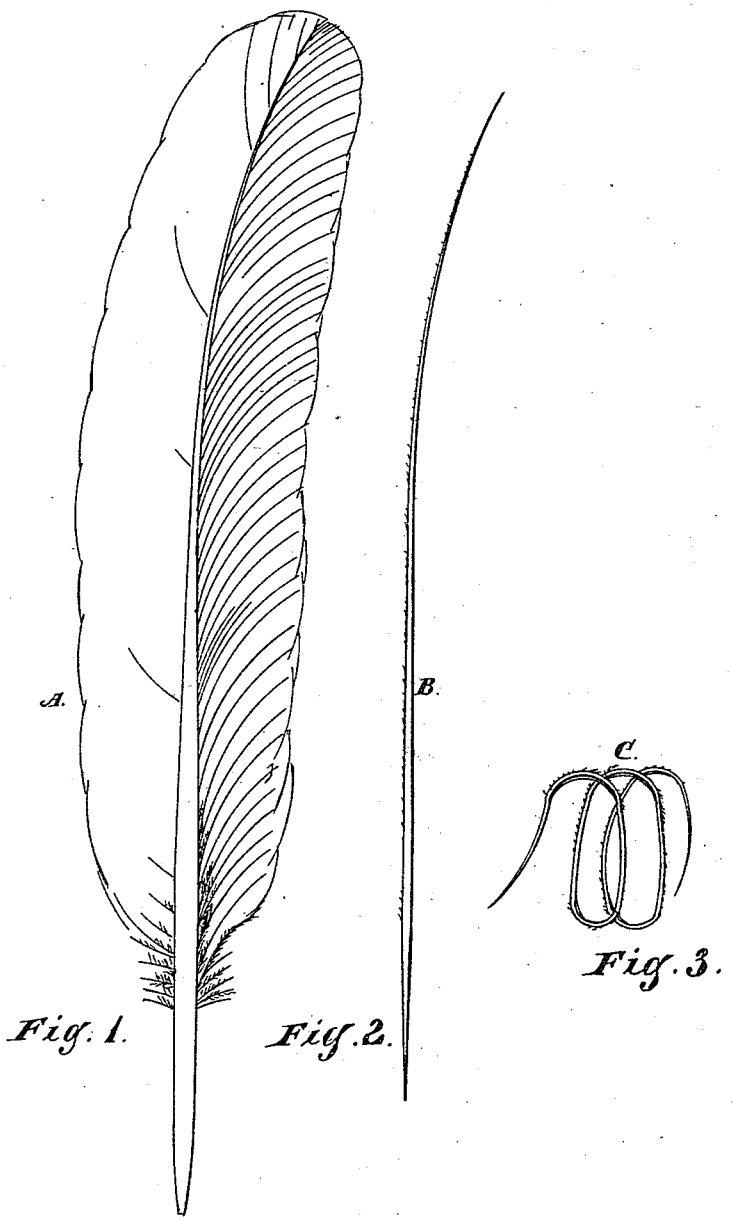

PLEASANT AMICK, OF CHICAGO, ILLINOIS, ASSIGNOR TO HIMSELF AND GEORGE W. WILSON, OF SAME PLACE.

UPHOLSTERING MATERIAL.

SPECIFICATION forming part of Letters Patent No. 226,261, dated April 6, 1880.

Application filed January 3, 1880.

*To all whom it may concern:*

Be it known that I, PLEASANT AMICK, residing at Chicago, in the county of Cook and State of Illinois, and a citizen of the United States, have invented a new and useful manufacture, being Upholstering Material, of which the following is a full description, reference being had to the accompanying drawings, in which—

Figure 1 represents a feather; Fig. 2, a single strip cut from the stem of the feather; Fig. 3, the same strip curled.

Hair, wool, sea-grass, and many other things are used by upholsterers for stuffing.

I have discovered that an article can be prepared from the stems of feathers, which can be used to advantage for such purpose, as hereinafter set forth. This article can be prepared from the stems of the feathers of turkeys and other fowls and birds in the following manner:

To make the best article I remove the vanes or fiber from the stems of the coarse feathers, and then split the stems, by any suitable means, into long narrow strips. In this form these strips are not very well adapted for the purpose mentioned, because the strips are nearly straight, and will pack together too closely, and will not furnish that elasticity which is desirable. I therefore curl these long narrow strips, so that when used in upholstering they will not be straight and flat, packing closely together with but little elasticity, but will be interwoven one piece with another in all directions. These strips may be curled by steaming and twisting into a rope, remaining in that form until dry or until wanted for use, when the rope is to be untwisted, or they may be curled by passing them between hot rollers.

The nature of the stems of feathers is such that the material prepared as described will be exceedingly elastic and will retain its elasticity a long time. It is very cleanly and free from objectionable qualities.

The feathers or the material can be easily renovated by well-known processes.

If desired, the pith may be removed. If not removed, it will be advisable to press or crush the stems for the purpose of flattening the pith.

In manufacturing this material a large quantity of feathers can be utilized which now have no market value and are wholly useless; so a large quantity of waste material which is cut from feathers in manufacturing well-known articles can be suitably prepared and utilized.

I thus furnish from that which has heretofore been wholly useless a cheap and valuable material for upholstering purposes, the same being durable, very elastic, odorless, not liable to absorb and retain foul air, easily renovated, and far superior in every respect to many of the articles now used for such purpose.

In the drawings, by which I have endeavored to illustrate my invention, A represents a feather. B is a long narrow strip formed by splitting the stem of the feather, the whole stem being split into strips of suitable size, including the quill portion. C represents the same strip after it has been curled.

I do not limit myself to the two methods mentioned of curling the strips, though I know of no more convenient means.

The long narrow strips might be bent or twisted into suitable shape by hand at the time of being placed in the article to be stuffed, and when stitched or tacked in place would answer a good purpose; but it is better to curl the same more permanently, as hereinbefore set forth.

What I claim as new, and desire to secure by Letters Patent, is as follows:

1. As a new article of manufacture, material for upholstering made from feathers by splitting the stems into strips and curling such strips, substantially as specified.

2. As a new article of manufacture, material for upholstering made from feathers by splitting the stems into long narrow strips, adapted to be bent or curled for use in upholstering, substantially as specified.

PLEASANT AMICK.

Witnesses:
E. A. WEST,
H. W. MURPHY.